(12) United States Patent
Hartlmeier et al.

(10) Patent No.: US 7,081,179 B2
(45) Date of Patent: Jul. 25, 2006

(54) METHOD AND SYSTEM FOR HIGH VOLUME, IN-MACHINE ASSEMBLY

(75) Inventors: Brian Hartlmeier, Elm Grove, WI (US); John J. Hahn, Hartford, WI (US); William Mentzer, Pewaukee, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 469 days.

(21) Appl. No.: 10/420,999

(22) Filed: Apr. 22, 2003

(65) Prior Publication Data

US 2004/0211509 A1  Oct. 28, 2004

(51) Int. Cl.
*B29C 65/40* (2006.01)
*B29C 65/48* (2006.01)
*B28B 5/12* (2006.01)

(52) U.S. Cl. .................. 156/245; 156/292; 156/303.1; 156/308.3; 156/443; 156/500; 156/539; 264/241; 264/248; 264/249; 264/250; 264/263; 425/347; 425/418

(58) Field of Classification Search .............. 156/245, 156/500, 242, 196, 212, 303.1, 308.4, 443, 156/539, 292; 264/241, 248, 249, 250, 263; 425/349, 418, 347
See application file for complete search history.

(56) References Cited

U.S. PATENT DOCUMENTS 4,744,741 A * 5/1988 Glover et al. ................ 425/123

FOREIGN PATENT DOCUMENTS

WO  WO 03/059596  * 7/2003

OTHER PUBLICATIONS

Peter Mapleston, "Technique Produces Assembled Hollow Parts Out of The Mold", Modern Plastics, Dec. 2002.

* cited by examiner

*Primary Examiner*—Sam Chuan Yao
*Assistant Examiner*—Barbara J. Musser
(74) *Attorney, Agent, or Firm*—Boyle Fredrickson Newholm Stein & Gratz S.C.

(57) ABSTRACT

An in-machine assembly technique uses revolving mold sections that rotate perpendicularly to the clamping axis of the injection-molding machine to increase usable mold area and to provide improved access to molded parts before and after assembly.

18 Claims, 3 Drawing Sheets

US 7,081,179 B2

METHOD AND SYSTEM FOR HIGH VOLUME, IN-MACHINE ASSEMBLY

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to injection molding machines and methods and, in particular, to an injection molding system that allows for the assembly of molded parts as a stage of the molding process.

Injection molding is a manufacturing process in which heated thermoplastic is forced under pressure into a mold. After the thermoplastic cools, the mold is separated along a part line and a molded thermoplastic part is ejected. With the proper mold, complex parts can be manufactured in extremely high volumes and low per piece costs.

Many products that cannot be manufactured by injection molding in a single mold can be assembled from one or more separately molded parts. The step of assembling these parts can significantly increase the cost of the product and in certain cases decrease part volumes otherwise obtainable.

For this reason, there is considerable interest in so-called "in-mold" assembly techniques. In one such technique termed "two shot" molding, a mold having replaceable portions allows different features to be added into one changing mold cavity over several sequential steps of plastic injection. The resulting product may be a single, fused structure or, by making the two shots of plastics that resist adhesion to each other, the resulting product may be an assembled collection of movable parts.

More complex products can be created by a different technique in which separately molded parts are partially retained by a portion of the mold which is then moved within the injection molding machine to a different position for assembly with other molded parts made simultaneously in a different portion of the same machine.

In one published method using this technique henceforth referred to as "in-machine" assembly, a product is manufactured using a four-part mold having two outer sections attached to the molding machine platens, and two center sections between these outer sections and which may rotate about two offset axes both parallel to the mold clamp direction. During a first step, parts are molded in mold cavities formed by the joining of corresponding portions of pairs of the outer sections and center sections. The molded parts are then retained on the center sections which rotate to move the molded parts into opposition for assembly. The mold sections are again closed and the molded parts are assembled.

The parts may be held together by adhesive, molded-in-place rivets or other techniques applied immediately before or during the mold closure. This technique for in-mold assembly may be suitable, for example, for manufacturing products having cavities loosely holding a non-molded material.

The in-machine molding technique described above requires a shaft to be extended through each platen of the injection molding machine for rotating the revolving mold section sections such as may require substantial modification of the injection molding machine. Further the full area of the platen cannot be exploited for molding because of the need to reserve room for assembly of cooled parts. This limits the molding throughput. Finally, insertion of other parts or application of glue to the parts prior to assembly is difficult because the parts are always in-between the platens and the molds limit access to those parts.

BRIEF SUMMARY OF THE INVENTION

The present invention provides an in-machine assembly technique for injection-molded parts in which the revolving mold sections rotate perpendicularly to the clamping axis of the molds. This rotation direction allows the full area of the platen to be used for molding, the assembly of parts being conducted on opposed faces of revolving mold sections after they have been rotated.

When a 90° rotational increment of each mold is adopted, the molded parts are exposed at the side of the machine for easy access when gluing or adding parts or inserts prior to assembly.

A third plastic injector at the interface between the revolving mold sections can be used in the assembly process.

Specifically, the present invention provides a molding system for in-machine assembly of product, the molding system usable on an injection-molding machine having opposed platens movable along a clamping axis. The system uses a first mold clamp plate having a mold face defining a first cavity portion for a first part, a first revolving mold section having at least two mold faces each defining a second cavity portion for the first part, the first revolving mold section rotatable about an axis perpendicular to the clamping axis to successively bring the mold faces of the first revolving mold section into opposition with the mold face of the first mold clamp plate.

The system also provides a second mold clamp plate having a mold face defining a first cavity portion for a second part interfitting with the first part and a second revolving mold section having at least two mold faces each defining a second cavity portion for the second part, the second revolving mold section rotatable about an axis perpendicular to the clamping axis to successively bring one mold face of the second revolving mold section into opposition with the mold face of the second mold clamp plate and a second mold face of the second revolving mold section into opposition with a mold face of the first revolving mold section. Molded parts may be assembled at the interface of the first and second revolving mold section faces.

Thus it is one object of the invention to provide an improved in-machine assembly technique offering higher volumes of part molding by better using the platen area.

It is another object of the invention to provide an improved in-machine assembly technique not requiring modification of the injection-molding machine to insert mold moving mechanisms behind the platens.

The first and second revolving mold sections may rotate by 180 degrees in between each molding cycle.

It is thus another object of the invention to provide a simple molding system usable with revolving mold sections that are not square in cross-section, but rectangular, and thus adaptable for use with injection molding machines having limited platen separation.

The first and second revolving mold sections each have four mold faces and may rotate by 90 degrees in between each molding cycle.

It is another object of the invention to provide improved access to the molded parts prior to assembly or after assembly as may be desired.

It is another object of the invention to provide an ability to use a third injector for the purpose of assembly of the parts or the adding of additional part features.

An insert loader may be placed proximate to a mold face of one of the first and second revolving mold sections when the mold face is rotated to be substantially parallel to the clamping axis to install an insert into one of the first and second parts.

It is another object of the invention to allow insertion of parts into a product during in-machine assembly.

An adhesive dispenser may be placed proximate to a mold face of one of the first and second revolving mold sections when the mold face is rotated to be substantially parallel to the clamping axis to dispense adhesive onto one of the first and second parts at an area of contact between the first and second parts when the first and second parts are assembled.

It is another object of the invention to provide a method in-machine assembly employing the application of common adhesives.

An injector for thermoplastic may be placed proximate to the interface between the first and second revolving mold sections.

Thus, it is another object of the invention to provide an in-machine assembly system that may connect parts through in-place molded rivets or seams.

These particular objects and advantages may apply to only some embodiments falling within the claims and thus do not define the scope of the invention.

DETAILED DESCRIPTION OF THE PREFERRED EMBODIMENT

Figure 1:
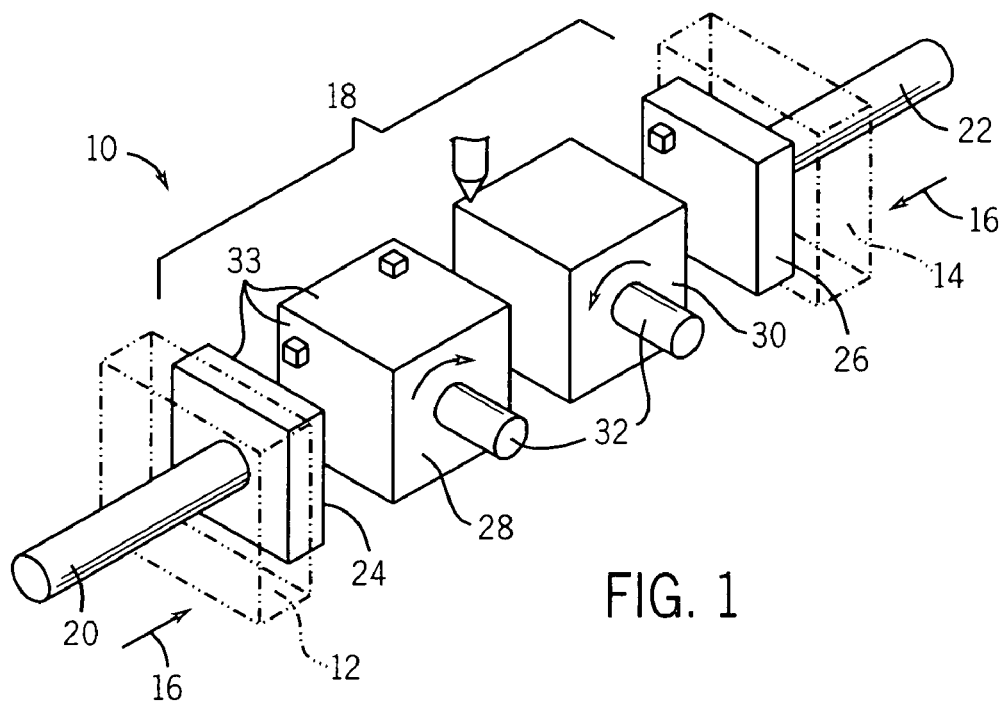
FIG. 1 is a simplified perspective view of an injection molding machine using the molding system of the present invention showing the mold clamp plates flanking revolving mold sections in unclamped position between platens and showing locations of a first, second and optional third injector unit.

Referring now to FIG. 1, the mold system 10 of the present invention may work with an injection-molding machine having opposed platens 12 and 14 that may be moved together in a part along clamping axis 16 about molds 18. Thermoplastic injectors 20 and 22 are positioned behind platens 12 and 14, respectively, to provide molten plastic material to mold clamp plates 24 and 26 attached to platens 12 and 14. Mold clamp plates 24 and 26 present mold faces at mold face positions 34a and 34f, respectively.

Positioned between mold clamp plates 24 and 26 are revolving mold sections 28 and 30. In the preferred embodiment revolving mold sections 28 and 30 have square cross-sections taken along a vertical plane and may be rotated by actuators 32 so as to present one of four equal area mold faces 33 at corresponding mold face positions 34b–34e and 34g–34j where initially mold face position 34b is vertical and opposed to mold face position 34a for mold clamp plate 24 with the lettering of subsequent mold face positions proceeding clockwise per rotation of the revolving mold section 28 and, mold face position 34g is vertical and opposed to mold face position 34f for mold clamp plate 26 with the lettering of subsequent mold face positions proceeding counterclockwise per rotation of the revolving mold section 30. The rotation mechanism for revolving mold sections 28 and 30 may make use of a mechanism similar to that described in pending U.S. application Ser. No. 09/993,202 filed Nov. 16, 2001 and hereby incorporated by reference.

Figure 2:
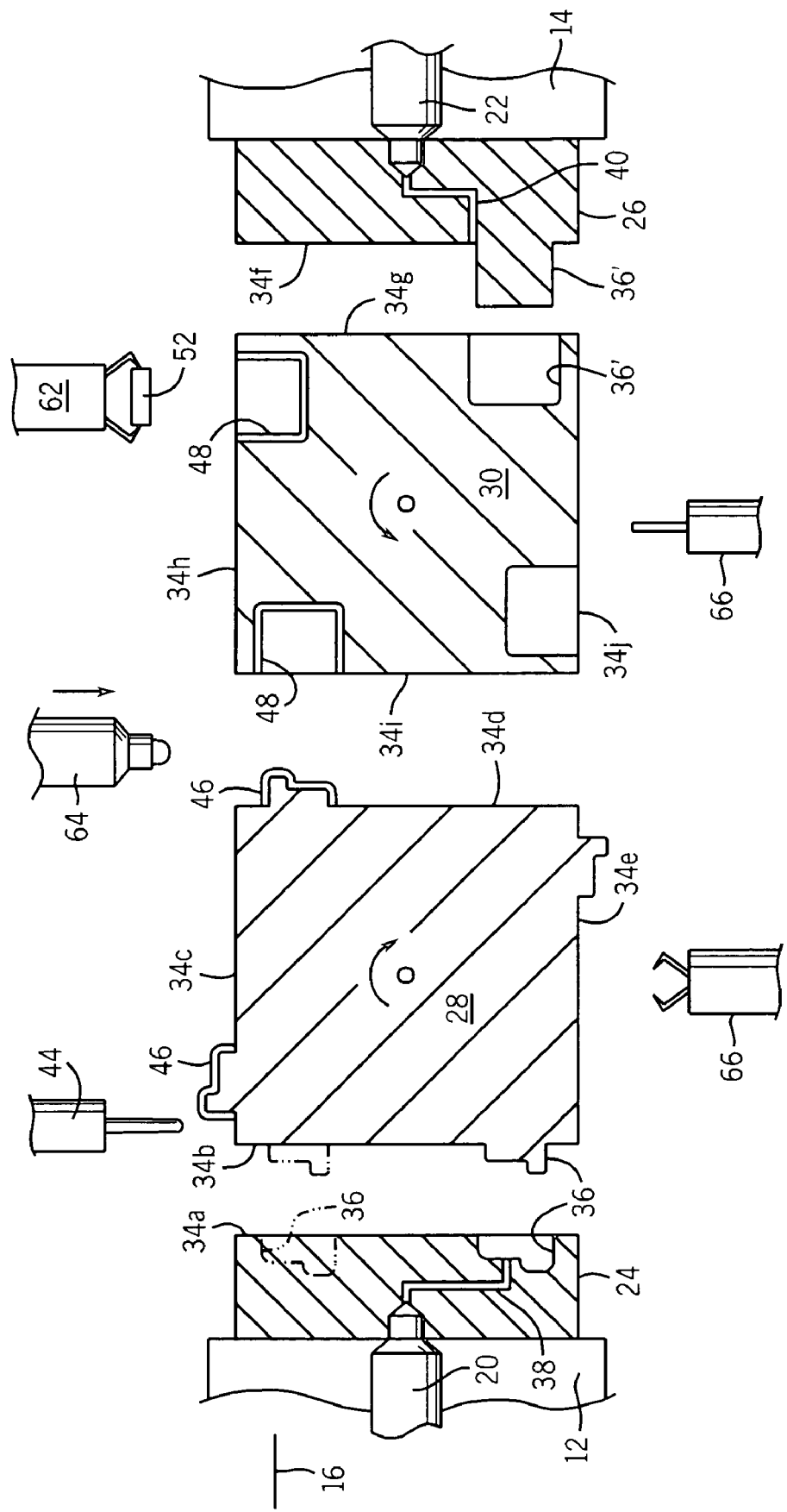
FIG. 2 is a side elevational view of the molding system of FIG. 1 showing positioning of insert and adhesive depositing mechanisms to the side of the molds.

Referring to FIG. 2, mold clamp plate 24 presents a mold face at mold face position 34(a), the mold face having one or more mold cavities 36 communicating with injector 20 through platen 12 and manifold channel 38 (only one mold cavity 36 is shown in solid lines for clarity). Revolving mold section 28 presents a corresponding mold face having one or mold cavities 36 at mold face position 34(b). When the platens 12 and 14 move together along the clamping axis 16, the mold clamp plate 24 and revolving mold section 28 join to form a part cavity that may be filled with thermoplastic material as is understood in the art to form a first molded part, in this case, a molded base 46.

Likewise, mold clamp plate 26 presents a mold face at mold face position 34(f), the mold face having one or more mold cavities 36' (only one shown for clarity) different from the mold cavity 36 of mold clamp plate 24. The mold cavity 36' on the mold clamp plate 26 communicating with injector 22 through platen 14 and manifold channel 40. Revolving mold section 30 presents a corresponding mold face having cavities 36' at mold face position 34(g). When the platens 12 and 14 move together along the clamping axis 16, the mold clamp plate 26 and revolving mold section 30 join to form a part cavity that may be filled with thermoplastic material to form a second molded part, in this case, a molded cover 48.

After a first molding operation, revolving mold sections 28 and 30 will rotate 90 degrees, clockwise and counterclockwise, respectively, the molded base 46 and molded cover 48 remaining with the revolving mold sections (enforced by the use of ejector pins on the mold clamp plates 24 and 25) to move to mold face positions 34(c) and 34(h), respectively. New mold faces will now oppose mold clamp plate 24 and mold clamp plate 26. The platens 12 and 14 will again close along axis 16 and injectors 20 and 22 will supply thermoplastic to the mold cavities 36 formed by the interface of mold clamp plate 24 and revolving mold section 28 and mold clamp plate 26 and revolving mold section 30 so new molded base 46 and molded cover 48 can be molded. It will be understood that the particular directions of rotation as clockwise and counterclockwise are a matter of engineering choice and not necessarily a limitation of the invention.

When platens 12 and 14 again separate, the revolving mold sections 28 and 30 again rotate bringing the original molded base 46 and molded cover 48 into opposition at mold face positions 34(d) and 34(i). When the platens 12 and 14 close again to mold new parts, revolving mold sections 28 and 30 are joined assembling the molded base 46 and molded cover 48 at their interface. New parts are also molded at the interface between mold clamp plate 24 and revolving mold section 28, and mold clamp plate 26 and revolving mold section 30. This process may be continued with new parts being molded and assembled at each turn on the revolving mold sections 28 and 30.

Figure 3:
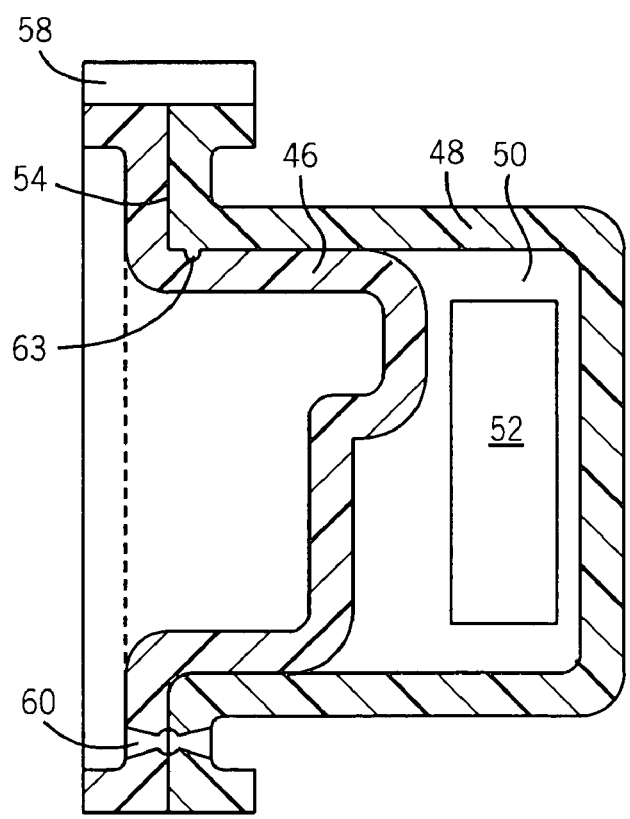
FIG. 3 is a cross-sectional view through a product assembled out of a cover and base molded part moldable using the molds of FIG. 2 and holding an insert and showing four methods of joining the parts, a seam, molded rivets, adhesive, and snap surfaces.

Referring now to FIG. 3, the part being molded may comprise a molded base 46 molded using revolving mold section 28, and a molded cover 48 molded using revolving mold section 30 and fitting over molded base 46 to produce an enclosed volume 50. The enclosed volume 50 may, for example, hold an insert 52 such as a paper filter or the like, that is separate from the plastic of the molded base 46 and molded cover 48.

As shown in this example, the molded base 46 fits within the molded cover 48 to meet at a seam 54. This seam can be joined by the application of adhesive at the seam 54 by a gasket material 58 (not necessarily flexible) which may be applied across the seam 54, and rivets 60 may be molded through the seam 54, or alternatively or in addition, by the detent surfaces 63 formed in interengaging surfaces of the molded base 46 and molded cover 48 allowing the molded base 46 and molded cover 48 to snap together with slight deformation of the plastic material of each.

When the platens 12 and 14 are closed, the molded base 46 and molded cover 48 are supported on the upper face of revolving mold section 28 and 30, respectively, and are readily accessible. A side-mounted adhesive gun 44 may be positioned near this side of the revolving mold section 28 to apply adhesive to the seam 54 of the molded base 46 when it is in this position.

Likewise, when the molded cover 48 is correspondingly exposed at the top of revolving mold section 30, the insert 52 may be placed in the molded cover 48 by a manipulator 62 or similar mechanism.

Both the adhesive gun 44 and manipulator 62 are free from interference with the platens 12 and 14 and molds 24, 28, 30, and 26 and thus may be easily positioned, and may operate with a simple linear motion different from that which would be required to insert parts within the gap between, for example, the mold clamp plate 26 and revolving mold section 30.

As mentioned, prior to assembly of each part, revolving mold sections 28 and 30 rotate in a clockwise and counter-clockwise direction, respectively, to bring molded base 46 and molded cover 48 into opposition at mold face positions 34(d) and 34(j) in FIG. 2. When the molds and platens 12 and 14 are closed again, molded base 46 held on revolving mold section 28 is inserted into molded cover 48 held on revolving mold section 30 and assembled. At this time, a third injector 64 positioned at the interface of revolving mold sections 28 and 30 when platens 12 and 14 are closed may be used to apply additional thermoplastic material to join the parts (as will be described) or to add additional structure or overmolding. Again, the injector 64 has good accessibility from the side of the injection molding machine.

When the platens 12 and 14 open again, the assembled part may be ejected by internal ejector pins as is understood in the art to drop between the revolving mold section 28 and 30 into a receiving bin. Alternatively, the parts may be ejected from one of the revolving mold sections 28 and 30 after an additional rotation.

Note alternatively, the lower surface of revolving mold section 28 and 30 may be used to place inserts into the mold cavities 36 and 36' before injection of the parts using insertion arms 66 as will be understood in the art.

It will be understood that although the horizontal axis of rotation of revolving mold sections 28 and 30 is shown in FIG. 1, a vertical axis perpendicular to axis 16 may also be employed. In addition, it will be understood that the rotation of revolving mold section 28 and 30 may be by increments of 180° per mold cycle rather than the 90 degrees described. In this case, revolving mold section 28 and 30 need not have square but may have rectangularcross-sections reducing the amount of separation required in the platens 14 and 16. It will be further understood that additional revolving mold sections 28 and 30 (for example, three or more in a row) may in fact be used to provide for either additional molding or assembly operations.

Figure 4:
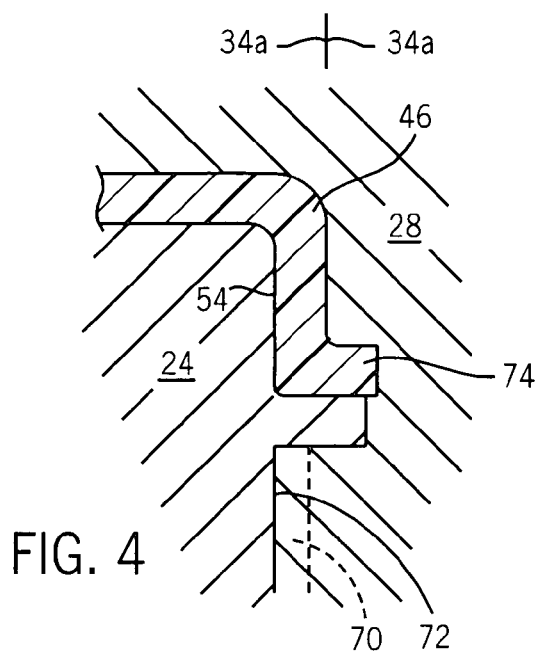
FIG. 4 is a detailed cross-sectional view of the cavity for molding the base of FIG. 3 formed by the connection of the first mold clamp plate and first revolving mold section such as will provide a seam at which a part will be assembled.
Figure 5:
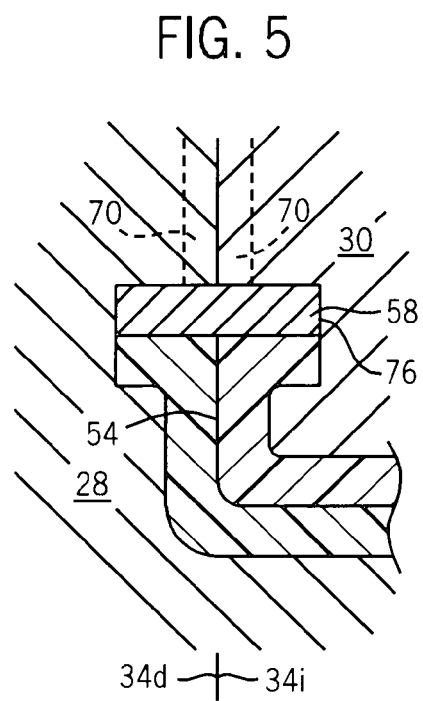
FIG. 5 is a view of the cavity formed by the interface between the first and second revolving mold sections showing the production of a channel through which a seam material may be injected to assemble the parts together.

Referring now to FIG. 4, use of injected plastic from injector 64 may be used to join the molded base 46 and molded cover 48 by means of a channel 70 formed in revolving mold section 28 along the part line 72 between mold clamp plates 12 and revolving mold section 28. The channel may extend toward the seam 54 on the molded base 46 but be blocked by an extension 74 of mold clamp plate 24, which will provide a gasket space at a later step shown in FIG. 5. A corresponding channel 70' leading to the seam. 54 may be provided by revolving mold section 30 and blocking extension 74 by mold clamp plate 26 (not shown).

When revolving mold sections 28 and 30 are rotated and mated, the extension 74 is gone creating a pocket 76 which will receive a gasket material 58 injected through abutting channels 70 and 70'. The gasket material 58 covers the seam 54 holding the molded base 46 and molded cover 48 together.

Figure 6:
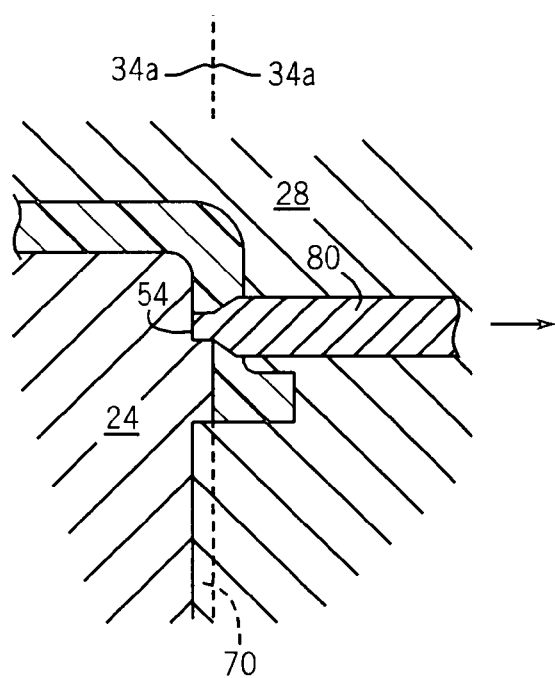
FIG. 6 is a figure similar to that of FIG. 4 showing an alternative mold configuration that provides an hourglass-shaped rivet pocket.

In an alternative embodiment shown in FIG. 6, wedge-tipped pins 80 may extend from revolving mold section 28 to the seam 54 of molded base 46 when the molded base 46 is molded. Channel 70 provides an access to the cavity formed by the wedge-tipped pins 80 when it is removed. Corresponding wedge-tipped pins 80 may extend from revolving mold section 30 to the seam 54 of molded cover 48 when the molded cover 48 is molded (not shown).

Figure 7:
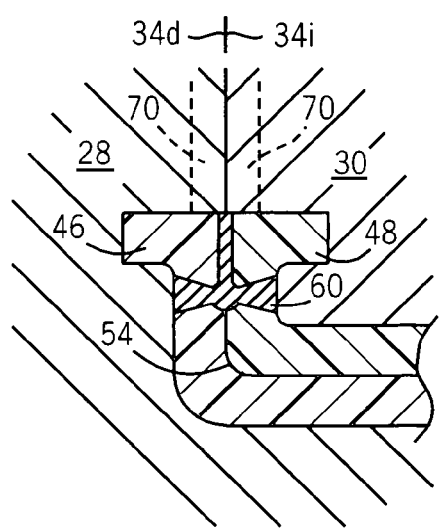
FIG. 7 is a figure similar to that of FIG. 5 showing filling of the hourglass-shaped rivet pocket to produce a rivet.

Referring to FIG. 7, the channel made up of channel 70' and 70 allows access to the cavities formed by wedge-tipped pins 80 to create an hourglass-shaped rivet 60 across seam 54 holding molded base 46 and molded cover 48 together.

It is specifically intended that the present invention not be limited to the embodiments and illustrations contained herein, but include modified forms of those embodiments including portions of the embodiments and combinations of elements of different embodiments as come within the scope of the following claims.

We claim:

1. A molding system for in-machine assembly usable on an injection molding machine having opposed platens movable along a clamping axis, the molding system comprising:

a first mold clamp plate having a mold face defining a first portion of a mold cavity for a first part;

a first revolving mold section having at least two mold faces each defining a second portion of a mold cavity for the first part, the first revolving mold section rotatable about an axis perpendicular to the clamping axis to successively bring the mold faces of the first revolving mold section into opposition with the mold face of the first mold clamp plate;

a second mold clamp plate having a mold face defining a first portion of a mold cavity for a second part interfitting with the first part; and a second revolving mold section having at least two mold faces each defining a second portion of a mold cavity for the second part, the second revolving mold section rotatable about an axis perpendicular to the clamping axis to successively bring one mold face of the second revolving mold section into opposition with the mold face of the second mold clamp plate and a second mold face of the second revolving mold section into opposition with a mold face of the first revolving mold section to assemble the first and second parts;

whereby molded parts may be assembled at the interface of the first and second revolving mold section faces.

2. The molding system of claim 1 wherein each of the revolving mold sections has multiple portions of a mold cavity defining multiple parts.

3. The molding system of claim 1 including further a supplemental plastic injector positioned at the interface of the first and second revolving mold sections when the molds are clamped together for providing injected plastic at the interface to assemble the first and second parts together.

4. The molding system of claim 1 wherein the first and second revolving mold sections each have four mold faces.

5. The molding system of claim 4 including further an insert loader proximate to a mold face of one of the first and second revolving mold sections when the mold face is rotated to be substantially parallel to the clamping axis to install an insert into one of the first and second parts.

6. The molding system of claim 4 including further an adhesive dispenser proximate to a mold face of one of the first and second revolving mold sections when the mold face is rotated to be substantially parallel to the clamping axis to dispense adhesive onto one of the first and second parts at a area of contact 5 between the first and second parts when the first and second parts are assembled.

7. The molding system of claim 4 wherein the second portion of a mold cavity for the first part on the first revolving mold section and the second portion of a mold cavity for the second part in the second revolving mold section provide a seam access channel leading to an interface between the first and second parts when the first and second parts are in the respective second cavities and assembled at the interface of the first and second revolving mold sections;

whereby joining material may be injected into the seam access channel to hold the first and second parts together.

8. The molding system of claim 4 wherein the second cavity for the first part on the first revolving mold section and the second cavity for the second part in the second revolving mold section provide a retractable mold portion forming a wedge shaped rivet channel in each of the first and second parts that align when the first and second parts are assembled at the interface of the first and second revolving mold sections;

whereby joining material may be injected into the wedge-shaped rivet channels to hold the first and second parts together.

9. An in-machine assembly method usable on an injection-molding machine having opposed platens movable along a clamping axis, the molding machine further providing:

a first mold clamp plate having a mold face defining a first portion of a mold cavity for a first part;

a first revolving mold section having at least two mold faces each defining a second portion of a mold cavity for the first part, the first revolving mold section rotatable about an axis perpendicular to the clamping axis to successively bring the mold faces of the first revolving mold section into opposition with the mold face of the first mold clamp plate;

a second mold clamp plate having a mold face defining a first portion of a mold cavity for a second part interfitting with the first part; and a second revolving mold section having at least two mold faces each defining a second portion of a mold cavity for the second part, the second revolving mold section rotatable about an axis perpendicular to the clamping axis to successively bring one mold face of the second revolving mold section into opposition with the mold face of the second mold clamp plate and a second mold face of the second revolving mold section into opposition with a mold face of the first revolving mold section;

the method comprising the steps of:

(a) clamping the first revolving mold section and second revolving mold sections between the first mold clamp plate and second mold clamp plate so that the first clamp plate presses one side of the first revolving mold section and an opposite side of the first revolving mold section presses a one side of the second revolving mold section and an opposite side of the second revolving mold section presses one side of the second clamp plate;

(b) injecting thermoplastic material into a mold cavity formed by the first and second portions of a mold cavity for the first part and the first and second portions of a mold cavity for the second part;

(c) unclamping the first revolving mold section and second revolving mold section and rotating each to bring the first and second parts into opposition as carried by the first revolving mold section and second revolving mold section;

(d) clamping the first revolving mold section and second revolving mold section between the first mold clamp plate and second mold clamp plate to assemble first and second parts at an interface between the first and second revolving mold sections.

10. The method of claim 9 including the step of repeating steps (b) through (d) in step (d) with substantially simultaneous execution of steps (b) and (d).

11. The method of claim 9 wherein the first and second revolving mold sections rotate by 180 degrees at step (c).

12. The method of claim 9 wherein the first and second revolving mold sections each have four mold faces, the first and second revolving mold sections rotate by 90 degrees at step (c).

13. The method of claim 9 wherein each of the molds has multiple portions of a mold cavity defining multiple parts and wherein steps (b) and (d) simultaneously molds and assemble multiple parts.

14. The method of claim 9 including the step of injecting plastic at the interface of the first and second revolving mold sections holding the first and second parts in the respective second cavities to assemble the first and second parts.

15. The method of claim 9 including the step of installing an insert into one of the first and second parts when a mold face holding the first or second part is rotated to be substantially parallel to the clamping axis.

16. The method of claim 9 including the step of dispensing adhesive onto one of the first and second parts at an area of contact between the first and second parts when the first and second parts are assembled at an interface between the first and second revolving mold sections when a mold face holding the part is rotated to be substantially parallel to the clamping axis.

17. The method of claim 9 including the step of injecting a thermoplastic material at a seam between the first and second parts when the first and second parts are assembled at the interface of the first and second revolving mold sections.

18. The method of claim 17 including the step of injecting thermoplastic into at least one wedge-shaped rivet channel in each of the first and second parts that align when the first and second parts are assembled at the interface of the first and second revolving mold sections.

\* \* \* \* \*